(12) United States Patent
Olaru et al.

(10) Patent No.: US 6,962,492 B2
(45) Date of Patent: Nov. 8, 2005

(54) GAP SEAL BETWEEN NOZZLE COMPONENTS

(75) Inventors: George Olaru, Toronto (CA); Denis Babin, Georgetown (CA)

(73) Assignee: Mold-Masters Limited, Ontario (CA)

(*) Notice: Subject to any disclaimer, the term of this patent is extended or adjusted under 35 U.S.C. 154(b) by 116 days.

(21) Appl. No.: 10/261,660

(22) Filed: Oct. 2, 2002

(65) Prior Publication Data

US 2003/0082263 A1 May 1, 2003

Related U.S. Application Data

(60) Provisional application No. 60/328,829, filed on Oct. 15, 2001.

(51) Int. Cl.[7] .............................................. B29C 45/20
(52) U.S. Cl. .................................. 425/549; 264/328.15
(58) Field of Search ...................... 425/549; 264/328.15

(56) References Cited

U.S. PATENT DOCUMENTS

| | | | |
|---|---|---|---|
| 4,013,393 A | 3/1977 | Gellert | |
| 4,043,740 A | 8/1977 | Gellert | |
| 4,053,271 A | 10/1977 | Gellert | |
| 4,173,448 A | 11/1979 | Rees et al. | |
| 4,268,240 A | 5/1981 | Rees et al. | |
| 4,268,241 A | 5/1981 | Rees et al. | |
| 4,279,588 A | 7/1981 | Gellert | |
| 4,286,941 A | 9/1981 | Gellert | |
| 4,662,837 A | 5/1987 | Anderson | |
| 4,950,154 A | 8/1990 | Moberg | |
| 5,208,052 A | 5/1993 | Schmidt et al. | |
| 5,299,928 A | 4/1994 | Gellert | |
| 5,324,191 A | 6/1994 | Schmidt | |
| 5,421,716 A | 6/1995 | Gellert | |
| 5,443,381 A | * 8/1995 | Gellert | ........................ 425/549 |
| 5,474,439 A | 12/1995 | McGrevy | |
| 5,492,467 A | 2/1996 | Hume et al. | |

(Continued)

FOREIGN PATENT DOCUMENTS

| | | |
|---|---|---|
| EP | 0 590 677 A1 | 6/1994 |
| EP | 1 321 274 A1 | 6/2003 |
| GB | 1 540 698 | 2/1979 |
| WO | WO 00/48814 | 8/2000 |

OTHER PUBLICATIONS

Daniel Frenkier and Henryk Zawistowski—RAPRA Technology Ltd., "Hot Runners in Injection Moulds", 2001.
Husky Injection Molding Systems, S.A. 750 Series.
J.D. Robinson, "Gating and Cooling Techniques for Polypropylene", Plastics, Aug., 1965, pp. 47–51.
Redacted letter and attached figure addressed to Mold Masters Limited from the representative of Mr. Maurizio Bazzo dated Dec. 21, 2001.

(Continued)

*Primary Examiner*—Tim Heitbrink
(74) *Attorney, Agent, or Firm*—Stener, Kessler, Goldstein and Fox P.L.L.C.

(57) ABSTRACT

A nozzle is provided for an injection molding apparatus. The nozzle includes a nozzle body, a heater, a tip, a tip surrounding piece. The nozzle body defines a nozzle body melt passage, which has an inlet that is adapted to be downstream from and in communication with a melt source. The heater is connected to said body for heating melt in said nozzle body melt passage. The tip defines a tip melt passage that is downstream from and in communication with said nozzle body melt passage. The tip melt passage has an outlet that is upstream from a gate in a mold component. The tip includes a tip sealing surface. The tip surrounding piece includes a first tip surrounding piece sealing surface. The first tip surrounding piece sealing surface and said tip sealing surface are separated by a gap. The gap is sized to inhibit the flow of melt between said first tip surrounding piece sealing surface and said tip sealing surface.

22 Claims, 8 Drawing Sheets

U.S. PATENT DOCUMENTS

| | | | |
|---|---|---|---|
| 5,545,028 A | 8/1996 | Hume et al. | |
| 5,554,395 A | 9/1996 | Hume et al. | |
| 5,658,604 A | 8/1997 | Gellert et al. | |
| 5,674,439 A | 10/1997 | Hume et al. | |
| 5,736,171 A | 4/1998 | McGrevy | |
| 5,738,171 A | 4/1998 | McGrevy | |
| 5,795,599 A | 8/1998 | Gellert | |
| 5,820,899 A * | 10/1998 | Gellert et al. | 425/549 |
| 5,855,626 A | 1/1999 | Swenson et al. | |
| 5,879,727 A | 3/1999 | Puri | |
| 5,885,628 A * | 3/1999 | Swenson et al. | 425/549 |
| 5,894,025 A | 4/1999 | Lee et al. | |
| 5,925,328 A | 7/1999 | Moberg | |
| 5,925,386 A | 7/1999 | Moberg | |
| 5,980,237 A | 11/1999 | Swenson et al. | |
| 6,022,210 A | 2/2000 | Gunther | |
| 6,030,202 A * | 2/2000 | Gellert et al. | 425/549 |
| 5,164,954 A | 12/2000 | Mortazawi et al. | |
| 6,164,954 A | 12/2000 | Mortazavi et al. | |
| 6,245,278 B1 | 6/2001 | Lausenhammer et al. | |
| 6,254,377 B1 | 7/2001 | Kazmer et al. | |
| 6,261,084 B1 | 7/2001 | Schmidt | |
| 6,264,460 B1 | 7/2001 | Wright et al. | |
| 6,284,480 B1 | 7/2001 | Wright et al. | |
| 6,287,107 B1 | 9/2001 | Kazmer et al. | |
| 6,394,785 B1 * | 5/2002 | Ciccone | 425/549 |
| 6,428,305 B2 | 8/2002 | Jenko | |
| 2003/0118688 A1 | 6/2003 | Bazzo et al. | |

OTHER PUBLICATIONS

Daniel Frankler and Henryk Zawistowski –RAPRA Technology Ltd., "Hot Runners in Injection Moulds", 2001.

Husky Injection Molding Systems, S.A. 750 Series.

J.D. Robinson, "Gating and Cooling Techniques for Polypropylene", Plastics, August, 1985, pp. 47–51.

* cited by examiner

GAP SEAL BETWEEN NOZZLE COMPONENTS

FIELD OF THE INVENTION

This invention relates to an injection molding apparatus, and more particularly to a nozzle seal for an injection molding apparatus.

BACKGROUND OF THE INVENTION

A hot runner injection molding apparatus typically includes nozzles that are heated to maintain melt therein at a controlled temperature. The nozzles are typically in contact with a mold component that defines one or more mold cavities. The mold cavities in the mold component are filled with melt that first passes through the nozzles. The mold component is then typically cooled in order to solidify the melt in the mold cavities, thus forming a plurality of molded parts, which are then ejected from the mold cavities.

Because the nozzles are typically heated, and the mold component is cooled for at least a portion of an injection molding cycle, it is desirable to have a relatively low heat transfer from the nozzles into the mold component. Many nozzle constructions have been proposed in the past to address this issue. Examples of such a nozzle construction is shown in U.S. Pat. Nos. 5,492,467 and 5,554,395, both to Hume et al.

The '467 patent teaches a hot runner nozzle having a nozzle body, an insert which is positioned in the nozzle body, and a bushing that surrounds the insert. The bushing contacts the mold component, to form a seal therebetween. The bushing and the insert are spaced apart so that a gap exists between them. During the injection process, molten material fills the gap between the insert and the bushing. With this configuration, some heat is lost from the insert, through the molten material, through the bushing and finally into the mold component. Furthermore, the molten material itself can make the disassembly of the nozzle difficult and time consuming.

The '395 patent teaches a multi-piece nozzle tip assembly including a tip piece, a tip surrounding piece and a mold component contact piece. The tip surrounding piece surrounds the tip piece and retains the tip piece in the nozzle. The tip surrounding piece is spaced from the tip piece. A mold component contact piece is provided between the tip piece and the mold component, to inhibit melt from filling the space between the tip piece and the tip surrounding piece. However, heat can be lost from the tip piece through the seal and into the mold component. In particular, the heat losses occur near the downstream end of the insert, where control over the temperature of the melt is particularly important.

Thus, there is a continuing need for new nozzle constructions that have further improved heat transfer efficiency.

SUMMARY OF THE INVENTION

In a first aspect, the invention is directed to a nozzle for an injection molding apparatus. The nozzle includes a nozzle body, a heater, a tip, a tip surrounding piece. The nozzle body defines a nozzle body melt passage, which has an inlet that is adapted to be downstream from and in communication with a melt source. The heater is connected to said body for heating melt in said nozzle body melt passage. The tip defines a tip melt passage that is downstream from and in communication with said nozzle body melt passage. The tip melt passage has an outlet that is upstream from a gate in a mold component. The tip includes a tip sealing surface. The tip surrounding piece includes a first tip surrounding piece sealing surface. The first tip surrounding piece sealing surface and said tip sealing surface are separated by a gap. The gap is sized to inhibit the flow of melt between said first tip surrounding piece sealing surface and said tip sealing surface.

In a second aspect, the present invention is directed to an injection molding machine that incorporates the nozzle described above.

DESCRIPTION OF THE DRAWINGS

For a better understanding of the present invention and to show more clearly how it may be carried into effect, reference will now be made by way of example to the accompanying drawings, in which.

DESCRIPTION OF THE PREFERRED EMBODIMENT

Reference is made in this patent application, to U.S. Pat. Nos. 4,013,393 to 4,043,740, 4,053,271, 4,279,588, 4,286, 941, 5,299,928 all to Gellert, 4,173,448, 4,268,240, 4,268, 241 all to Rees, U.S. Pat. No. 5,208,052 to Schmidt, U.S. Pat. No. 5,554,395 to Hume and U.S. Pat. No. 6,245,278 to Lausenhammer all of which are incorporated herein by reference.

In a hot runner injection nozzle system, there are two critical areas where there is a heat loss. One area is between the nozzle and the injection manifold, and the other area is between the nozzle and the mold component in the area of the gate, as described in the literature by for example, Rapra Technology Ltd, whose article Hot Runners in Injection Moulds, by Daniel Frenkler and Henryk Zawistowski, with English translation by Robert Walkden is incorporated by reference.

Figure 1:
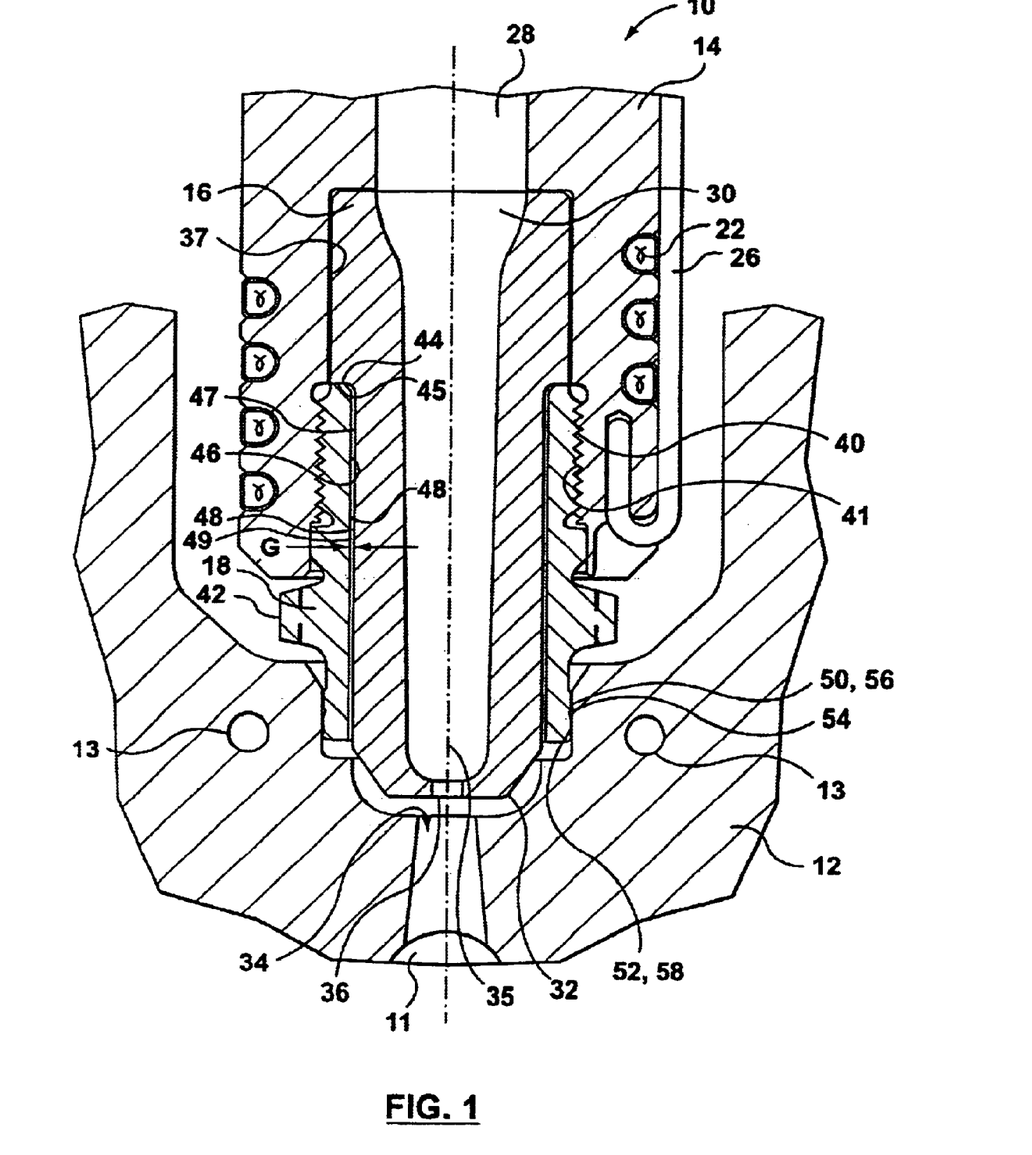
FIG. 1 is a sectional side view of a portion of a nozzle in accordance with a first embodiment of the present invention.

Reference is made to FIG. 1, which shows a nozzle 10, in accordance with a first embodiment of the present invention. Nozzle 10 is for transferring melt from a runner in a manifold in a hot runner injection molding apparatus to a mold cavity 11 in a mold component 12. Mold cavity cooling channels 13 may optionally be included in mold component 12.

Nozzle 10 includes a body 14, a tip 16, a tip surrounding piece 18, a heater 22, and may include an optional thermocouple 26. The body 14 has a body melt passage 28 that passes therethrough. The nozzle 10 includes a viscosity seal 48 which is a seal made between two surfaces which do not contact each other.

The tip 16 may be removably connectable to the body 14. The tip 16 defines a tip melt passage 30 therethrough that is downstream from and in fluid communication with the body melt passage 28. The tip melt passage 30 may exit from tip 16 into a chamber 32 that surrounds nozzle tip 16. A gate 34 transfers melt from the chamber 32 into the mold cavity 11.

Melt passes from a melt source, through one or more runners in a runner component such as a manifold, through the nozzle body melt passage 28, through the tip melt passage 30, through the chamber 32, through the gate 34 and finally into the mold cavity 11. The centre of the gate 34 defines an axis 35, which is parallel to the direction of flow of melt through gate 34, into the mold cavity 11.

The exit from the tip melt passage into the chamber 32 is shown at 36. Exit 36 may be concentric with respect to axis 35, as shown in FIG. 1.

Because the melt flows through the tip 16, the tip 16 can be used to transfer heat from the heater 22 to the melt. To facilitate the heat transfer, the tip 16 is preferably made from a thermally conductive material, such as Beryllium-Copper.

Because of the melt flow through tip 16, the tip 16 may be exposed to a highly abrasive environment, and it may be desirable to make the tip 16 from a wear resistant material. An example of a material that is both thermally conductive and wear resistant is Tungsten Carbide. The tip 16 may be made in accordance with the teachings in U.S. Pat. No. 5,658,604 (Gellert et al.), which is hereby incorporated by reference and which discloses the construction of a nozzle tip using Tungsten Carbide.

The tip 16 may be positioned within a bore 37 in the nozzle body 14. Depending on the material selected for the tip 16, a threaded portion can be relatively difficult to machine. Furthermore, such a threaded portion can be brittle and subject to premature failure, depending on the material of manufacture for the tip 16. Thus, by making the tip 16 threadless, a greater number of materials are available for its manufacture.

Furthermore, by making the tip 16 threadless, some cost of manufacture is saved for the tip 16 and correspondingly for the body 14, relative to a threaded tip.

The tip surrounding piece 18 may retain the tip 16 in place in the nozzle body 14. Because the melt that contacts the tip surrounding piece 18 is generally slower moving than the melt flowing through the tip 16, the tip surrounding piece 18 may be made from a material that is less wear resistant than that of the tip 16. Accordingly, the tip surrounding piece 18 may be made from a material that is relatively easily machined with threads.

The tip surrounding piece 18 may contact the mold component 12, as shown in FIG. 1. To reduce heat losses from the tip 16 and from the nozzle body 14 into the mold component 12, the tip surrounding piece 18 may be made from a material that has a thermal conductivity that is lower than that of the material for the nozzle tip 16, depending on the specific requirements of the molding application. Alternatively, the tip surrounding piece 18 may be made from a material that has a thermal conductivity that is similar to that of the nozzle tip 16.

The tip surrounding piece 18 may be removably attachable to the nozzle body 14. For example, the tip surrounding piece 18 may include a threaded portion 40 for mating with a corresponding threaded portion 41 on the nozzle body 14. The threaded portion 40 as shown in FIG. 1 is an external thread, however, it is alternatively possible for the tip surrounding piece to include an internal thread to mate with an external thread on the nozzle body 14.

The tip surrounding piece 18 may also include a tool engagement portion 42, for receiving a tool (not shown), for the installation and removal of the tip surrounding piece 18 with respect to the nozzle body 14.

The tip surrounding piece 18 may include a jam surface 44 for mating with a shoulder 45 on the tip 16. When the tip surrounding piece 18 is attached to the nozzle body 14, the jam surface 44 mates with the shoulder 45 on the tip 16, to retain the tip 16 in place in the bore 37. The jam surface 44 and the shoulder 45 may cooperate to form a mechanical seal.

The tip surrounding piece 18 further includes a first tip surrounding piece sealing surface 46, which cooperates with a tip sealing surface 47 on the tip 16 to form a viscosity seal 48, which may also be referred to as a gap seal. The first surrounding piece sealing surface 46 and the tip sealing surface 47 are separated from each other by a gap G.

Due to the viscosity of the melt in the chamber 32, the proximity of the first tip surrounding piece sealing surface 46 and the tip sealing surface 47 inhibits melt from flowing between the first tip surrounding piece sealing surface 46 and the tip sealing surface 47. Thus, the gap G, in conjunction with the viscosity of the melt, acts as a seal.

An advantage to including a viscosity seal 48 is that the manufacturing tolerances for sealing surfaces 46 and 47 are less demanding, relative to a typical mechanical sealing portion. A further advantage is that because melt does not pass through the gap seal 48, an air space 49 is maintained between the tip 16 and the tip surrounding piece 18. The air space 49 provides an insulative layer to reduce heat transfer between the tip 16 and the tip surrounding piece 18.

The gap seal 48 can maintain the air space 49 without the need for contact between the tip 16 and any other component, particularly contact at or near the outlet end of the tip 16, where melt temperature is particularly important. By avoiding such contact between the tip 16 and another component, the heat losses from the tip 16 are reduced.

The Gap G is preferably between approximately 0.02 and approximately 0.07 mm if it is the only seal and is not combined with a mechanical seal. If the jam surface 44 on the tip surrounding piece 18 and the shoulder 45 on the tip 16 form a mechanical seal, the gap G may be approximately 0.15 mm with a range of approximately 0.05 to 0.35 mm. It will be noted that the gap G required to inhibit the flow of melt is dependent on the specific molding application. The theological properties of the melt at the injection temperature, such as its viscosity, determine the maximum gap G that provides the desired seal.

The tip surrounding piece 18 may further include a second tip surrounding piece sealing surface 50, which mates with a mold component sealing surface 52 to form a nozzle-mold component seal 54. The nozzle-mold component seal 54 inhibits the leakage of melt out of the chamber 32. The nozzle-mold component seal 54 may be any suitable kind of seal, such as, for example, a mechanical seal, or a viscosity seal, or a combination of both.

The tip surrounding piece 18 may include a tip surrounding piece alignment surface 56, which mates with a mold component alignment surface 58 to align the nozzle 10 with respect to the gate 34. In the embodiment shown in FIG. 1, the tip surrounding piece alignment surface 56 and the second tip surrounding piece sealing surface 50 may be the same surface. Also, the mold component alignment surface 58 and the mold component sealing surface 52 may be the same surface.

Figure 2:
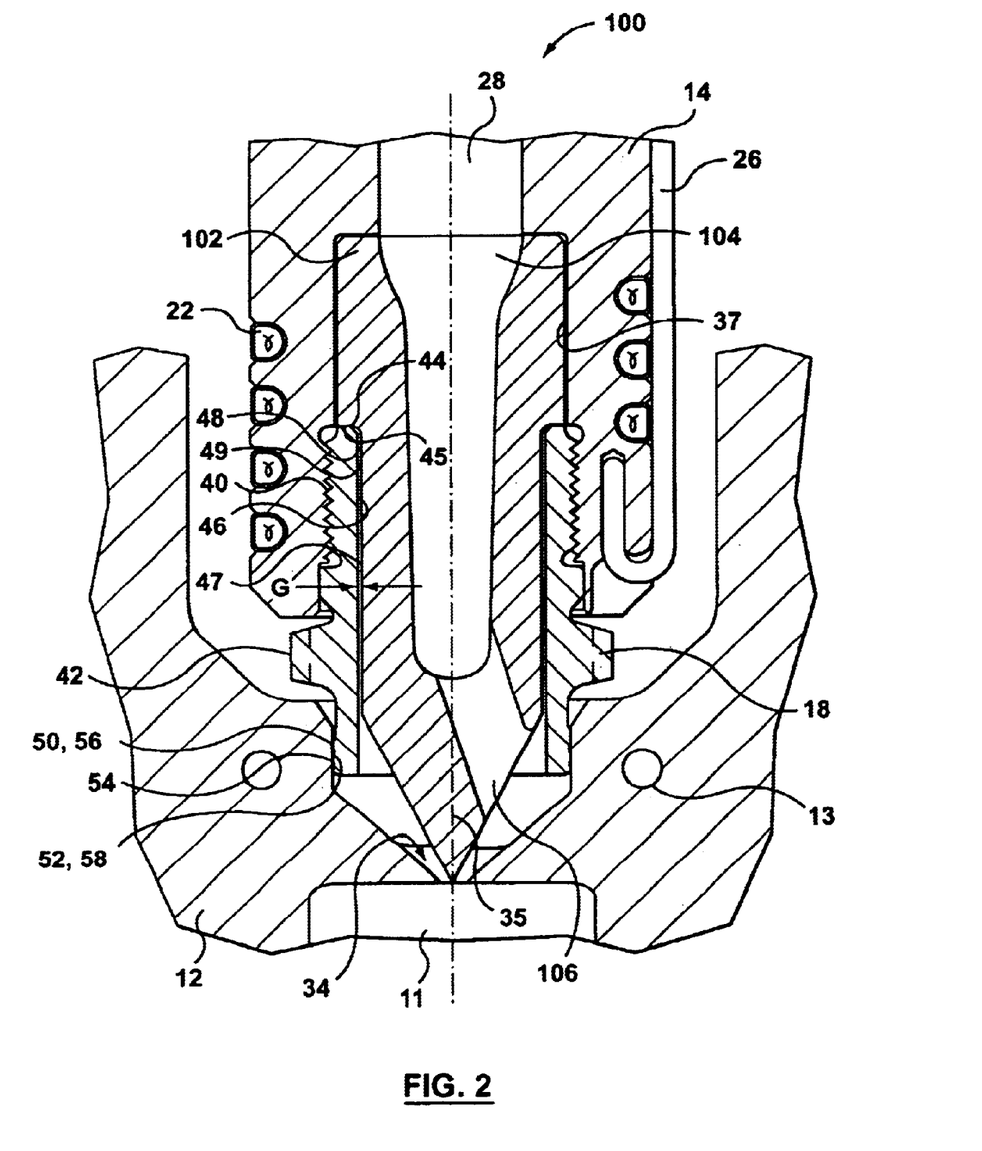
FIG. 2 is a sectional side view of a portion of a nozzle in accordance with a second embodiment of the present invention.

Reference is made to FIG. 2, which shows a nozzle 100 that includes a tip 102. Tip 102 differs from tip 16 in that tip 102 has a melt passage 104 with an exit 106 that is off-centre from the axis 35 of the gate 34. Nozzle tip 102 is used to extend the heating surface in contact with the melt flow into the gate 34, to maintain the temperature of the melt close to the mold cavity 11.

Thus, a nozzle in accordance with the present invention may have a tip that inserts into the gate 34 and has an off-centre melt passage exit with respect to the axis 35, or alternatively has a tip that has a concentric melt passage exit with respect to the axis 35.

Figure 3:
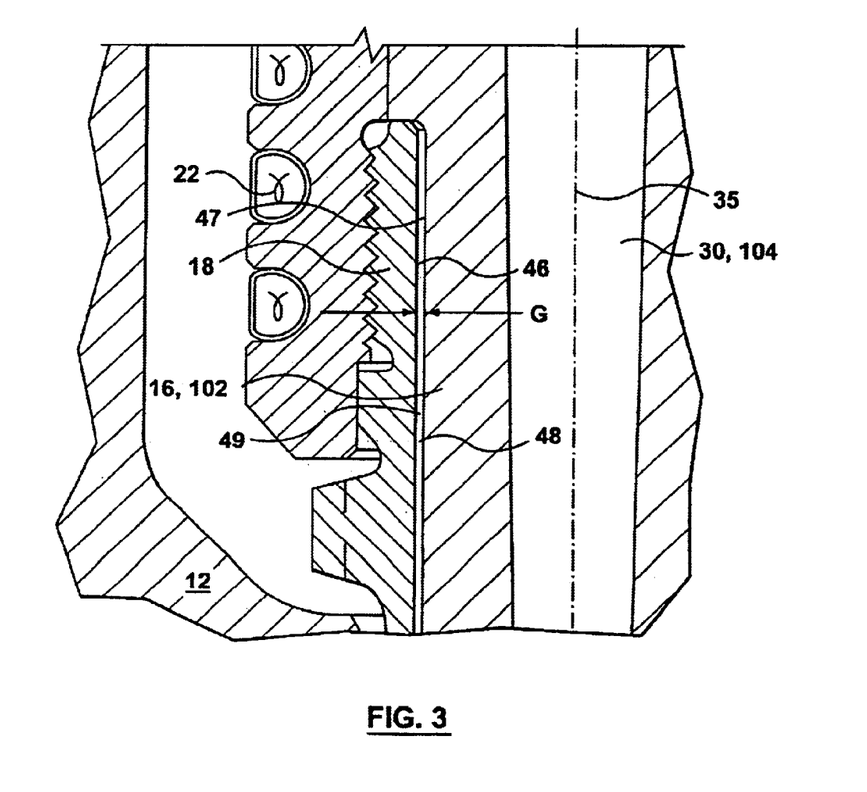
FIG. 3 is a magnified view of a sealing portion of the nozzle shown in FIGS. 1.

Reference is made to FIG. 3, which shows a magnified view of the viscosity seal 48 in the embodiments of FIGS. 1 and 2.

Figure 4:
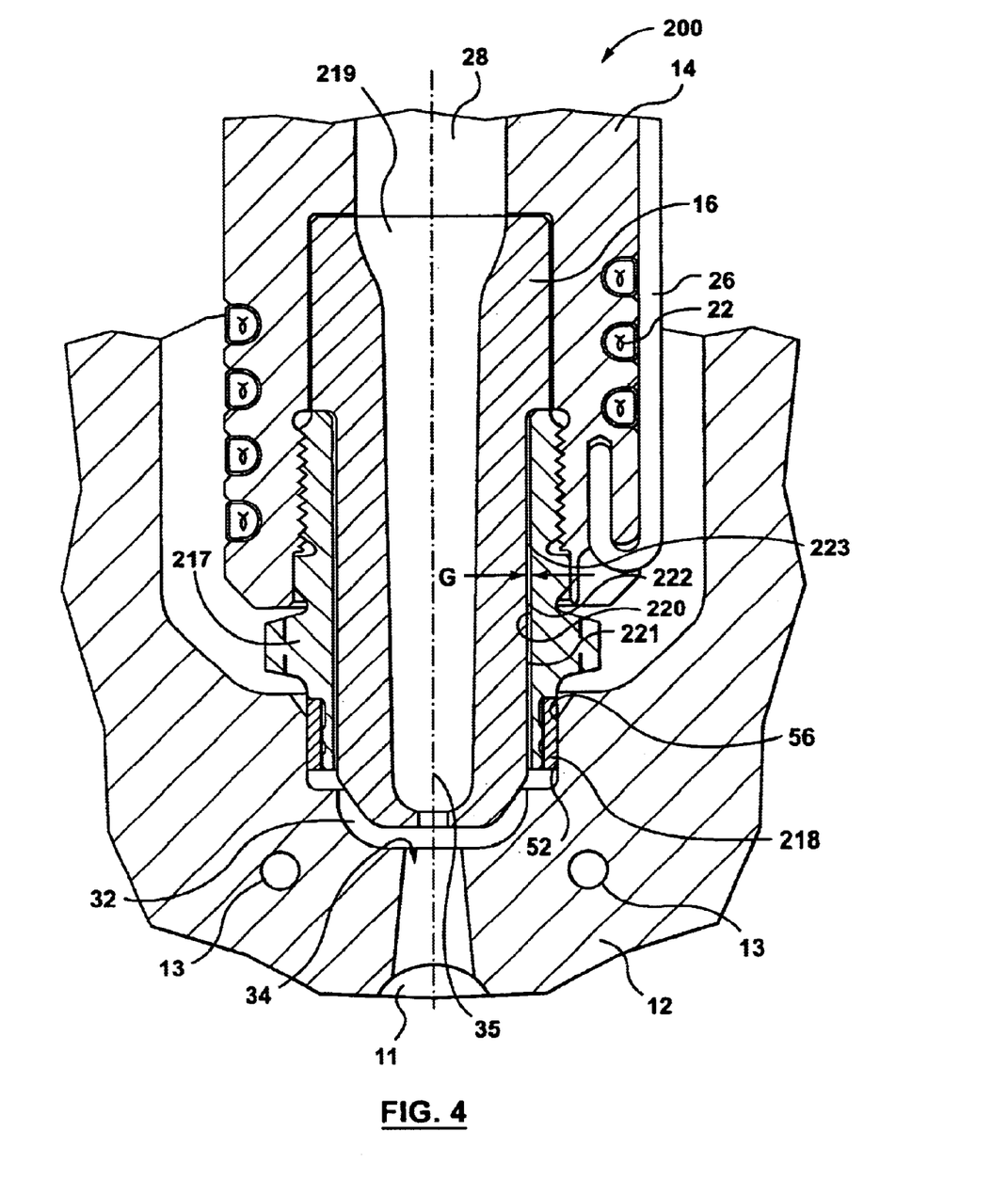
FIG. 4 is a sectional side view of a portion of a nozzle in accordance with a third embodiment of the present invention.

Reference is made to FIG. 4, which shows a nozzle 200 in accordance with a third embodiment of the present invention. The nozzle 200 includes the nozzle tip 16, a tip surrounding piece 217, a mold component contact piece 218, the heater 22, and may include an optional thermocouple 26.

The tip surrounding piece 217 may be similar to the tip surrounding piece 18. In the embodiment shown in FIG. 4, the tip surrounding piece 217 is positioned between the tip melt passage, which is shown at 219 and the heater 22 along a portion of the length of the tip melt passage 219. Thus the tip surrounding piece 217 is preferably made from a thermally conductive material to reduce losses between the heater 22 and the tip 16. The tip surrounding piece 217 may be made from such materials as Be—Cu, Aluminum, Molybdenum or suitable Molybdenum alloys.

Along a portion of the length of the tip surrounding piece 217, there may be direct contact with the tip 16, to further improve the heat transfer. Along the remainder of the length of the tip surrounding piece 18, however, is provided a first tip surrounding piece sealing surface 220, which cooperates with a tip sealing surface 221 to form a gap seal 222. Along the length of the gap seal 222, an air space 223 is defined, and the sealing surfaces 220 and 221 are separated by the gap G.

The mold component contact piece 218 may be joined to the tip surrounding piece 217 and may seal therewith against melt leakage. The mold component contact piece 218 may form a seal with the mold component 12, to inhibit melt leakage therepast from chamber 32, and may also serve to align the nozzle 10 with respect to the gate 34. The seals formed between the mold component contact piece 218 and the tip surrounding piece 217, and between the mold component contact piece 218 and the mold component 12 may be any suitable kinds of seals, such as mechanical seals.

To reduce the heat transfer from the nozzle 200 into the mold component 12, the mold component contact piece 218 may be made from a material that is comparatively less thermally conductive than that of the tip surrounding piece 18. For example, the mold component contact piece 218 may be made from titanium, H13, stainless steel, mold steel or chrome steel, for example. As another alternative, the mold component contact piece 218 may be made from ceramic. Other suitable materials for the mold component contact piece 218 are disclosed in U.S. Pat. No. 5,879,727 (Puri), which is hereby incorporated by reference. Puri discloses such materials for use as an insulative layer for a nozzle.

Figure 5:
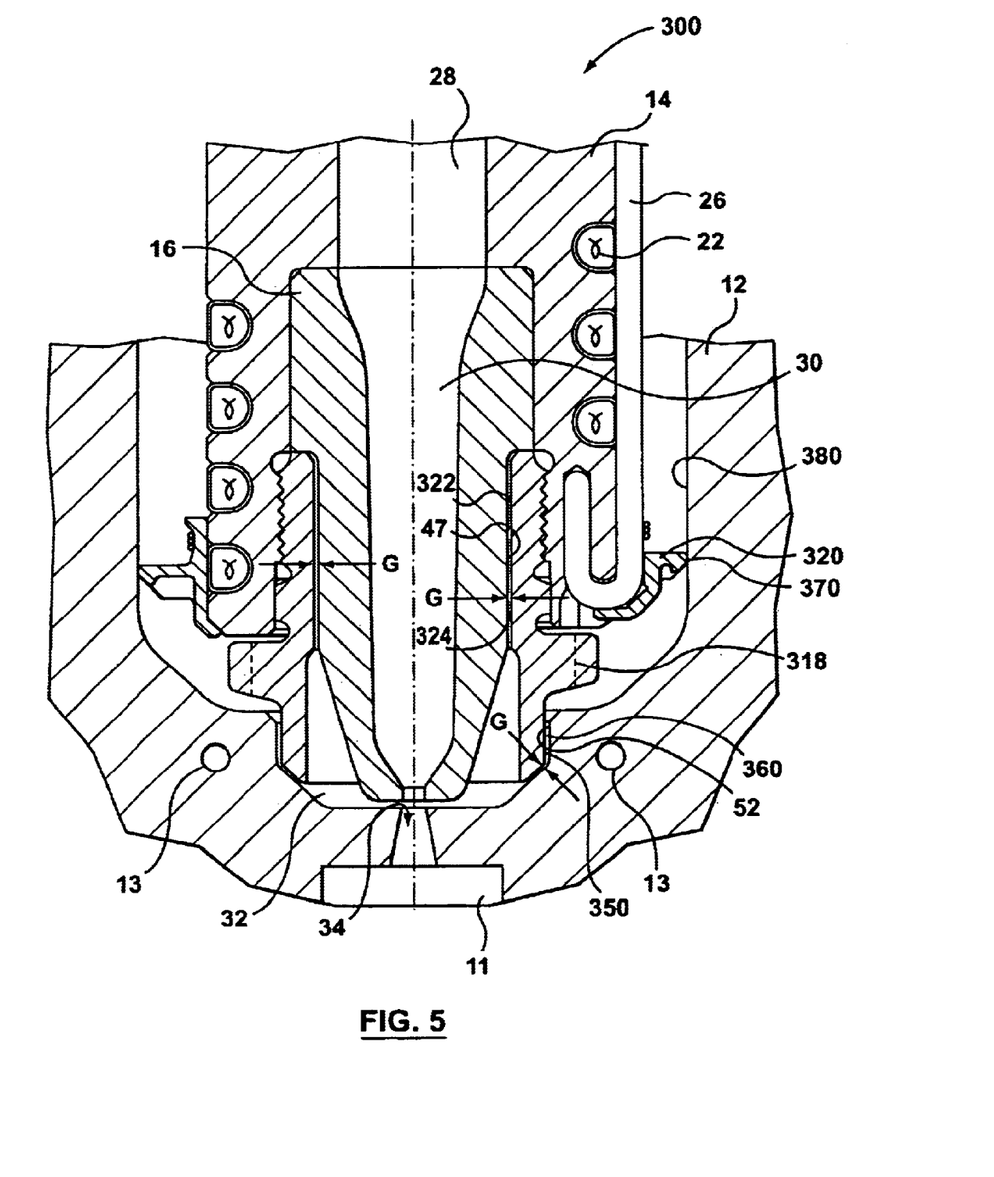
FIG. 5 is a sectional side view of a portion of a nozzle in accordance with a fourth embodiment of the present invention.

Reference is made to FIG. 5, which shows a nozzle 300 in accordance with a fourth embodiment of the present invention. Nozzle 300 includes the nozzle body 14, the nozzle tip 16, a tip surrounding piece 318, a nozzle guide 320 and may include the optional thermocouple 26.

The tip surrounding piece 318 may be similar to the tip surrounding piece 18, and includes a first tip surrounding piece sealing surface 322, which cooperates with the tip sealing surface 47 to form a gap seal 324 therewith. The sealing surfaces 322 and 47 are separated by the gap G.

The tip surrounding piece 318 further includes a second tip surrounding piece sealing surface 350, which cooperates with the mold component sealing surface 52 to form another viscosity seal 360, to inhibit melt leakage out of the chamber 32. Because the sealing surfaces 350 and 52 do not contact, the heat transfer between the nozzle 300 and the mold component 12 is further reduced. Also, because the sealing surfaces 350 and 52 do not contact each other, the nozzle guide 320 can be included as an alignment means for the nozzle 300 in the mold component 12. The nozzle guide 320 has an outer edge 370 that aligns nozzle 300 in a bore 380 of mold component 12.

Figure 6:
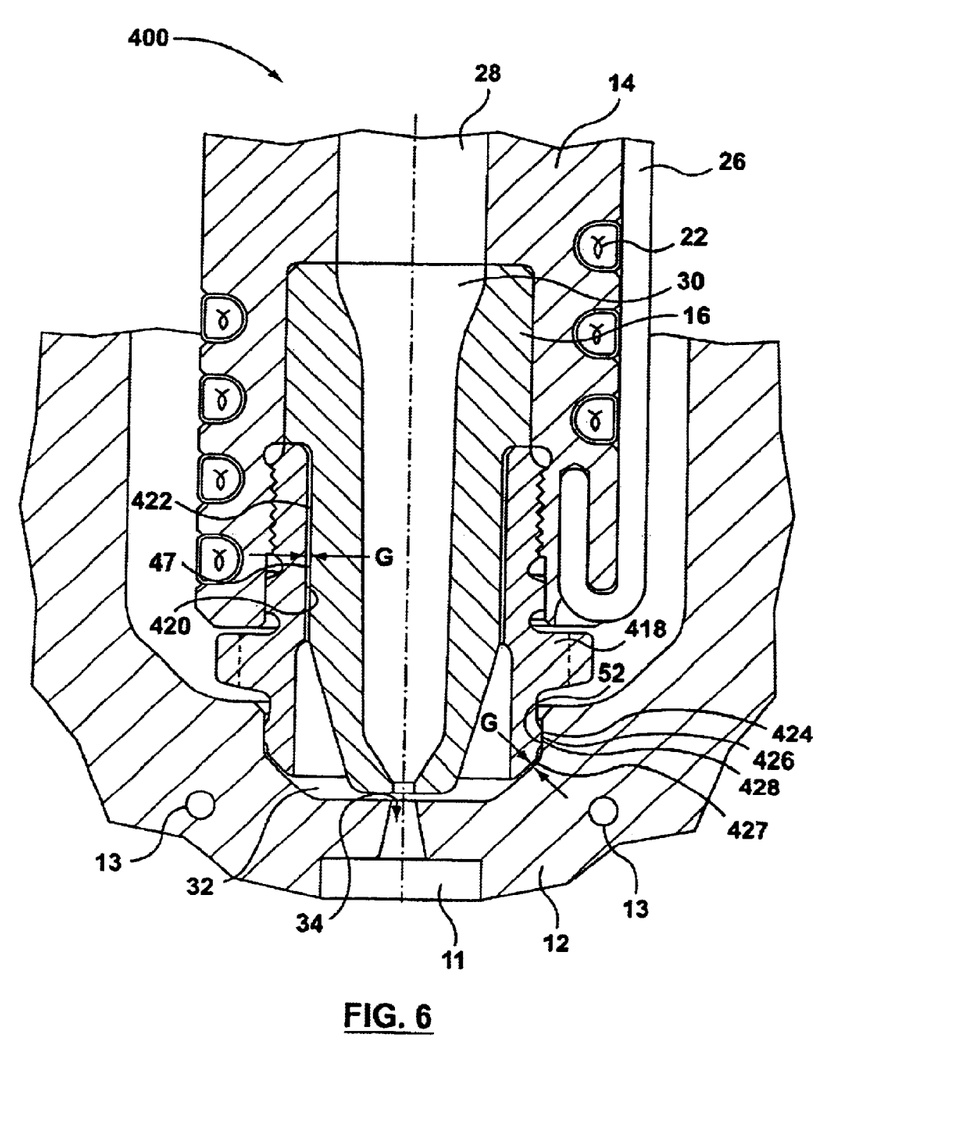
FIG. 6 is a sectional side view of a portion of a nozzle in accordance with a fifth embodiment of the present invention.

Reference is made to FIG. 6, which shows a nozzle 400 in accordance with a fifth embodiment of the present invention. The nozzle 400 is similar to nozzle 300 and includes the tip 16, a tip surrounding piece 418, the heater 22 and may include the optional thermocouple 26. The tip surrounding piece 418 includes a first tip surrounding piece sealing surface 420 which cooperates with the tip sealing surface 47 to form a viscosity seal 422 therebetween. The sealing surfaces 420 and 47 are separated by the gap G.

The tip surrounding piece 418 also includes a second tip surrounding piece sealing surface 424 that cooperates with the mold component sealing surface 52 to form a nozzle seal 426. The nozzle seal 426 may include a first seal portion 427 that is a viscosity seal and a second seal portion 428 that is a mechanical seal. The second portion 428 of the nozzle seal may also serve as an alignment means for aligning the nozzle 400 with respect to the gate 34.

Figure 7:
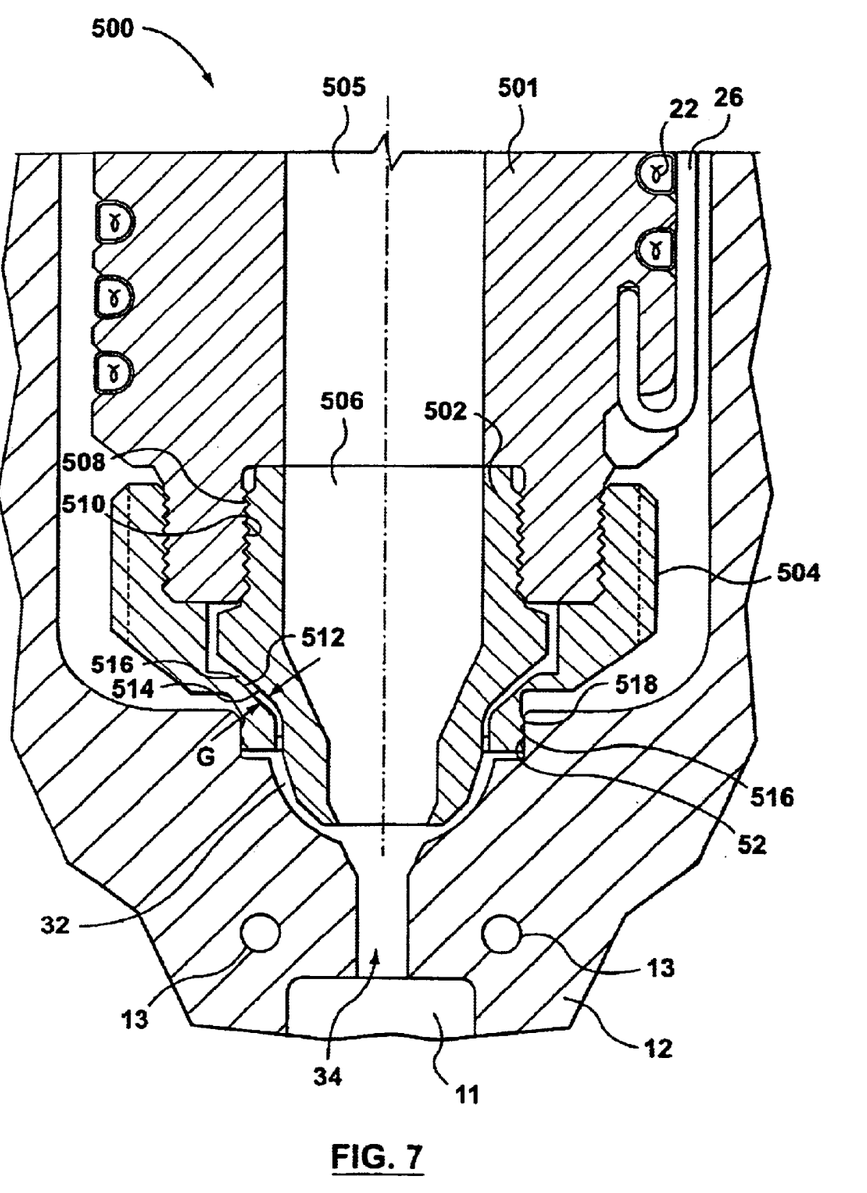
FIG. 7 is a sectional side view of a portion of a nozzle in accordance with a sixth embodiment of the present invention.

Reference is made to FIG. 7, which shows a nozzle 500 in accordance with a sixth embodiment of the present invention. The nozzle 500 includes a nozzle body 501, a tip 502, a tip surrounding piece 504, the heater 22 and may include the optional thermocouple 26.

The nozzle body 501 may be similar to the nozzle body 14 and defines a nozzle body melt passage 505 therethrough. The tip 502 may be similar to the tip 16 and may define a tip melt passage 506 therethrough that is downstream from and in fluid communication with the nozzle body melt passage 505. The tip 502 may include a first threaded portion 508 which cooperates with a second threaded portion 510 on the nozzle body 501.

The tip surrounding piece 504 may be similar to the tip surrounding piece 18, and may include a first tip surrounding piece sealing portion 512, which cooperates with a tip sealing surface 514 to form a viscosity seal 516 therebetween. The sealing surfaces 512 and 514 are separated by the gap G.

The tip surrounding piece 504 does not, in the embodiment shown in FIG. 7, retain the tip 502 in place in the nozzle body 501. By eliminating contact between the tip 502 and the tip surrounding piece 504, and by including the viscosity seal 516 therebetween, heat losses from the tip 502 are reduced.

The tip surrounding piece 504 may include a second tip surrounding piece sealing portion 516 with cooperates with the mold component sealing surface 52 to form a nozzle seal 518 therewith to inhibit melt leakage out of the chamber 32.

Figure 8:
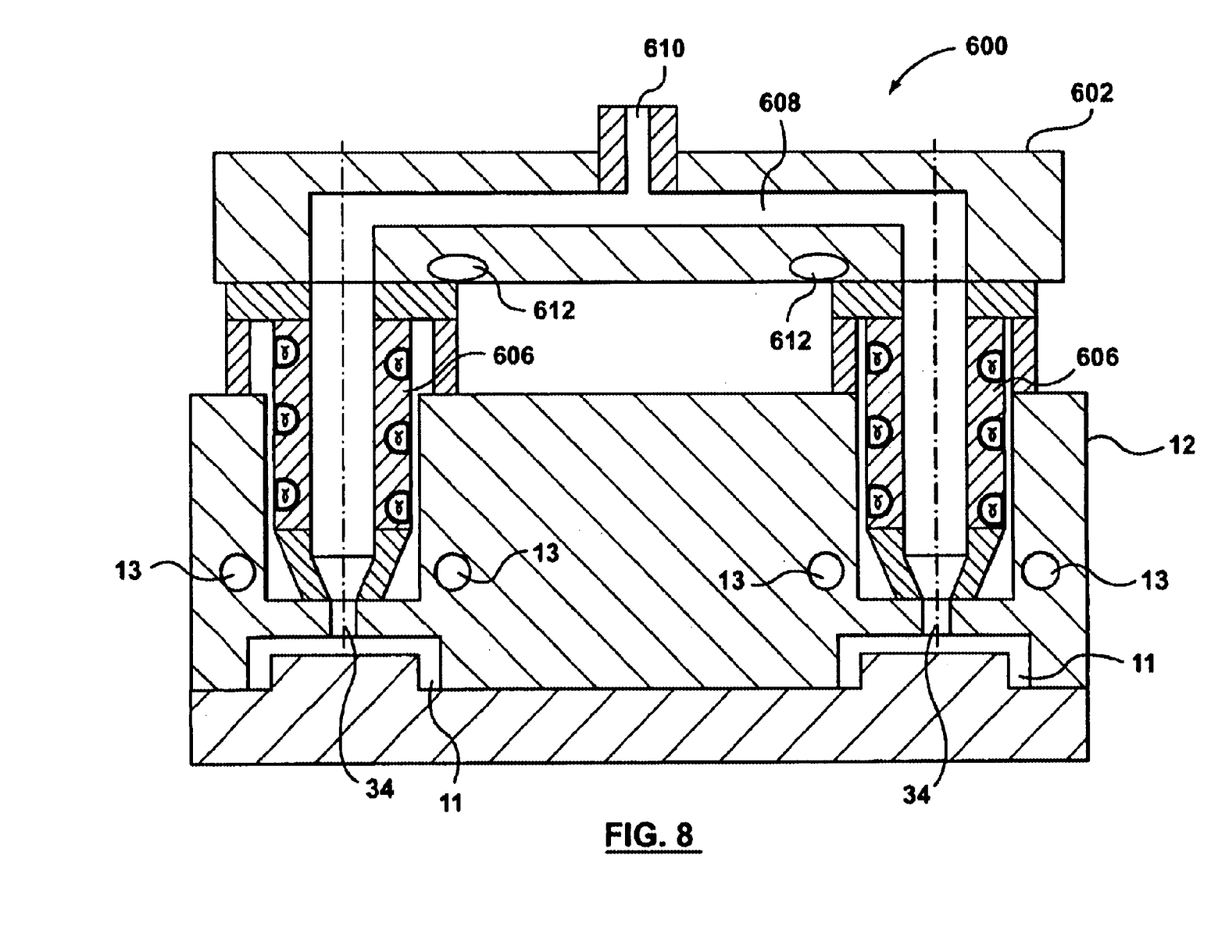
FIG. 8 is a sectional side view of an injection molding apparatus having a plurality of nozzles in accordance with the present invention.

Reference is made to FIG. 8, which shows an injection molding apparatus 600, that includes a runner component 602, the mold component 12 and a plurality of nozzles 606 in accordance with the present invention.

The runner component 602 includes a plurality of runners 608, which transfer melt from a main runner inlet 610 to the nozzles 606. The runner component 602 may be heated by a heater 612.

The nozzles 606 transfer melt from the runner component to the mold component 12. The nozzles 606 may be any of the nozzle embodiments described above and shown in FIGS. 1–7.

It will be appreciated that the particular configuration of the viscosity sealing portion may be selected depending on the specific molding application, including the Theological properties of the melt, such as its viscosity at the injection temperature.

While the above description constitutes the preferred embodiments, it will be appreciated that the present invention is susceptible to modification and change without departing from the fair meaning of the accompanying claims.

What is claimed is:

1. A nozzle for an injection molding apparatus, comprising:
    a nozzle body, said nozzle body defining a nozzle body melt passage, said nozzle body melt passage having an inlet that is adapted to be downstream from and in fluid communication with a melt source;
    a heater that is connected to said body for heating melt in said nozzle body melt passage;
    a tip, said tip defining a tip melt passage that is downstream from and in communication with said nozzle body melt passage, and said tip melt passage having an outlet that is upstream from a gate in a mold component, said nozzle tip including a tip sealing surface; and
    a tip surrounding piece, said tip surrounding piece including a first tip surrounding piece sealing surface,
    wherein said first tip surrounding piece sealing surface and said tip sealing surface are separated by a gap, and said gap is sized to inhibit the flow of melt between said first tip surrounding piece sealing surface and said tip sealing surface.

2. A nozzle as claimed in claim 1, wherein said gap is sized in relation to the temperature of said melt, and the viscosity of the melt intended to flow through the nozzle.

3. A nozzle as claimed in claim 1, wherein an air space is defined between said tip and said tip surrounding piece, and said air space is adapted to insulate said tip against heat loss out of said tip.

4. A nozzle as claimed in claim 1, wherein said tip piece is made from a thermally conductive material.

5. A nozzle as claimed in claim 4, wherein said tip surrounding piece is made from a material that is less thermally conductive than the material of said tip.

6. A nozzle as claimed in claim 4, wherein said tip surrounding piece is made from a material that has a thermal conductivity that is generally similar to the thermal conductivity of said tip.

7. A nozzle as claimed in claim 1, wherein said tip surrounding piece is adapted to contact said mold component.

8. A nozzle as claimed in claim 1, wherein said tip surrounding piece is adapted to cooperate with said mold component to form a seal therewith to inhibit melt leakage therepast.

9. A nozzle as claimed in claim 1, wherein said tip surrounding piece is adapted to cooperate with said mold component to align said nozzle with respect to said gate.

10. A nozzle as claimed in claim 1, further comprising a mold component contact piece that is attached to said tip surrounding piece, wherein said mold component contact piece is adapted to cooperate with said mold component to form a seal therewith to inhibit melt leakage therepast.

11. A nozzle as claimed in claim 1, further comprising a mold component contact piece that is attached to said tip surrounding piece, wherein said mold component contact piece is adapted to cooperate with said mold component to align said nozzle with respect to said gate.

12. An injection molding apparatus, comprising:
    a mold component and at least one nozzle;
    wherein said mold component defining a mold cavity and a gate into said mold cavity,
    wherein said at least one nozzle includes a nozzle body, said nozzle body defining a nozzle body melt passage, said nozzle body melt passage having an inlet that is adapted to be downstream from and in communication with a melt source;
    wherein said at least one nozzle includes a heater that is connected to said body for heating melt in said nozzle body melt passage;
    wherein said at least one nozzle includes a tip, said tip defining a tip melt passage that is downstream from and in communication with said nozzle body melt passage, and said tip melt passage having an outlet that is upstream from said gate, said nozzle tip including a tip sealing surface; and
    wherein said at least one nozzle includes a tip surrounding piece, said tip surrounding piece including a first tip surrounding piece sealing surface,
    and wherein said first tip surrounding piece sealing surface and said tip sealing surface are separated by a gap, and said gap is sized to inhibit the flow of melt between said first tip surrounding piece sealing surface and said tip sealing surface.

13. An injection molding apparatus as claimed in claim 12, wherein said gap is sized in relation to the temperature of said melt, and the viscosity of the melt intended to flow through the nozzle.

14. An injection molding apparatus as claimed in claim 12, wherein an air space is defined between said tip and said tip surrounding piece, and said air space is adapted to insulate said tip against heat loss out of said tip.

15. An injection molding apparatus as claimed in claim 12, wherein said tip piece is made from a thermally conductive material.

16. An injection molding apparatus as claimed in claim 15, wherein said tip surrounding piece is made from a material that is less thermally conductive than the material of said tip.

17. An injection molding apparatus as claimed in claim 15, wherein said tip surrounding piece is made from a material that has a thermal conductivity that is generally similar to the thermal conductivity of said tip.

18. An injection molding apparatus as claimed in claim 12, wherein said tip surrounding piece is adapted to contact said mold component.

19. An injection molding apparatus as claimed in claim 12, wherein said tip surrounding piece is adapted to cooperate with said mold component to form a seal therewith to inhibit melt leakage therepast.

20. An injection molding apparatus as claimed in claim 12, wherein said tip surrounding piece is adapted to cooperate with said mold component to align said nozzle with respect to said gate.

21. An injection molding apparatus as claimed in claim 12, further comprising a mold component contact piece that is attached to said tip surrounding piece, wherein said mold component contact piece is adapted to cooperate with said mold component to form a seal therewith to inhibit melt leakage therepast.

22. An injection molding apparatus as claimed in claim 12, further comprising a mold component contact piece that is attached to said tip surrounding piece, wherein said mold component contact piece is adapted to cooperate with said mold component to align said nozzle with respect to said gate.

* * * * *